United States Patent
Hathaway et al.

(10) Patent No.: US 7,353,477 B2
(45) Date of Patent: Apr. 1, 2008

(54) METHOD OF IDENTIFYING PATHS WITH DELAYS DOMINATED BY A PARTICULAR FACTOR

(75) Inventors: David J. Hathaway, Underhill, VT (US); Kerim Kalafala, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 842 days.

(21) Appl. No.: 10/709,327

(22) Filed: Apr. 28, 2004

(65) Prior Publication Data

US 2005/0243869 A1   Nov. 3, 2005

(51) Int. Cl.
*G06F 17/50*   (2006.01)
(52) U.S. Cl. ........................................................ 716/6
(58) Field of Classification Search ................. 716/6
See application file for complete search history.

(56) References Cited

U.S. PATENT DOCUMENTS

| | | | |
|---|---|---|---|
| 5,359,535 A | 10/1994 | Djaya et al. | |
| 5,655,107 A * | 8/1997 | Bull | 703/13 |
| 5,751,593 A | 5/1998 | Pullela et al. | |
| 5,838,581 A | 11/1998 | Kuroda | |
| 5,845,233 A | 12/1998 | Fishburn | |
| 5,896,301 A | 4/1999 | Barrientos | |
| 5,903,472 A | 5/1999 | Barrientos | |
| 6,014,510 A | 1/2000 | Burks et al. | |
| 6,209,122 B1 | 3/2001 | Jyu et al. | |
| 6,412,101 B1 | 6/2002 | Chang et al. | |
| 6,415,426 B1 * | 7/2002 | Chang et al. | 716/9 |
| 6,449,754 B1 | 9/2002 | You et al. | |
| 6,553,550 B1 | 4/2003 | Menegay et al. | |

FOREIGN PATENT DOCUMENTS

JP    8314991 A    9/1998

OTHER PUBLICATIONS

W.E. Donath, E.M. Sharp, M.L. White, "Performance Evaluation For Automated Layout Procedures", IBM Technical Disclosure Bulletin, vol. 25, No. 10, Mar. 1983, pp. 5049-5051.
J.W. Davis, R.D. Glenn, G. Lleonart, "Optimum Routing of Critical Circuit Timing Paths", IBM Technical Disclosure Bulletin, vol. 30, No. 12, May 1988, pp. 300-302.

* cited by examiner

*Primary Examiner*—Jack Chiang
*Assistant Examiner*—Brandon Bowers
(74) *Attorney, Agent, or Firm*—Gibb & Rahman, LLC; Richard M. Kotulak, Esq.

(57) ABSTRACT

A method of performing node-based static timing analysis on a digital network and a program storage device for implementing the method, wherein the method comprises partitioning timing delays in the digital network into portions attributable to a factor of interest and portions attributable to other factors; multiplying the timing delays by different weights based on the factor of interest to produce weighted timing delays; and using the multiplied timing delays to determine a relative impact of the factor of interest on the various paths in the digital network. The method further comprises setting arrival times of timing signals at digital network path start points to zero and identifying digital network paths whose timing delays are dominated by a particular factor of interest. The different weights comprise any of a positive weight, a negative weight, and a zero weight.

14 Claims, 4 Drawing Sheets

METHOD OF IDENTIFYING PATHS WITH DELAYS DOMINATED BY A PARTICULAR FACTOR

BACKGROUND OF INVENTION

1. Field of the Invention

The invention generally relates to design performance analysis, and more particularly to static timing analysis used in digital design testing.

2. Description of the Related Art

In the technological field relating to static timing analysis, various methods are used to determine whether a digital design satisfies a given set of predefined performance requirements. For performance analysis purposes, the digital design may be represented as a timing graph consisting of nodes and edges. Nodes typically represent pins of circuits comprising the digital design, and edges represent connections between pins, either from source to sink of a wire or from input to output of a logic gate. Each edge has an associated delay (or in some cases a minimum and maximum delay), and a path through the design is a chain of connected nodes and edges from an input of the design to an output of the design. The delay of each edge reflects the time it takes for a signal transition at the source of the edge to cause a signal transition at the sink of the edge, and is caused by the physical characteristics (e.g., capacitances, resistances, threshold voltages, etc.) of the transistors, wires, and other structures in the design. It is well understood that outputs of storage elements of the design (e.g., flip-flops and latches) may be considered starting points for paths, and inputs of storage elements may be considered ending points for paths. The delay or length of the path is the sum of the delays of the edges in the path. A timing graph may also include timing tests (e.g., setup tests), which are requirements that the latest arrival time at one point in the network (e.g., the data pin of a flip-flop or latch) is at least a specified amount (e.g., a setup time) earlier than the earliest arrival time at another point in the network (e.g.; the clock pin of the same flip-flop or latch).

Conventional path-based approaches to static timing analysis trace all (or the top N) paths through a network and then compare the total delay of each path to a predetermined timing specification. However, a disadvantage of path-based approaches is that the number of paths through a digital network (and hence the runtime of the method) can be exponential in the size of the overall network, and thus examination of all paths in real designs may be impossible in practice.

Another conventional approach is to use node-based algorithms in which information regarding only the longest or shortest path is retained at a given node. In this approach an arrival time (AT) is computed for each node X in the design which is the extreme (minimum when determining shortest paths and maximum when determining longest paths) over all predecessor nodes Y (i.e., nodes Y for which an edge from Y to X exists) of the AT of Y plus the delay (minimum delay for shortest path and maximum delay for longest path) of the edge from Y to X.

Use of maximums to determine the longest path is also known as late mode timing analysis, and use of minimums to determine the shortest path is also known as early mode timing analysis. The longest or shortest path to an output can be determined by tracing back from that output along the series of the edges which determined the extreme AT at each node. Well-known methods also exist to determine the N longest or shortest paths in the design or to determine all paths with maximum AT greater than a given value or minimum AT less than a given threshold by using the node-based timing analysis results to trace sub-paths through the design. However, a problem with this approach is that the analysis may miss a path which is significant in its timing delay and which may affect the design performance.

Delays in digital networks may come from a variety of elements (e.g., gates and wires), and can be influenced by a variety of design characteristics. The industry has recognized that the variation in design characteristics is becoming increasingly important, and in fact, it is suggested by industry experts that statistical timing analysis will be a crucial design capability for nanotechnology designs at 90 nm and below. Thus it is important to have static timing analysis methods capable of providing a complete and accurate assessment in design performance evaluation.

For example, suppose a circuit designer sought to gather all paths in the design (regardless of slack) that have greater than X % wire delay and desires to print these paths in slack order. Traditionally, this is a difficult problem with conventional node-based static timing analysis because only the information about the longest or shortest path to a node is retained on that node. However, there may be sub-critical paths (paths which are not the longest or shortest) which have a much higher fraction of wire delay than the longest or shortest path. Thus, no AT threshold can be specified which can be used with conventional node-based methods which ensures that all paths with delays dominated by the factor of interest will be found. In fact, the only known conventional methods known to answer this problem involve tracing all paths in the network; however this may be impractical due to excessive runtimes, as described above.

Other conventional approaches to static timing analysis and design performance evaluation using timing delays are taught in U.S. Pat. No. 5,838,581 issued to Kuroda; U.S. Pat. No. 6,014,510 issued to Burks et al.; U.S. Pat. No. 6,412,101 issued to Chang et al.; and U.S. Pat. No. 6,209,122 issued to Jyu et al., the complete disclosures of which, in their entireties, are herein incorporated by reference. However, while the above-referenced prior art techniques and systems were adequate for the purposes for which they were designed, their solutions have not distinguished between various types of delays in the paths through a network, and have rather focused on the total delay of all the paths. Therefore, there is a need for a novel node-based static timing analysis approach capable of providing a thorough assessment and evaluation of design performance.

SUMMARY OF INVENTION

The invention provides a method of identifying timing paths in a digital network with timing delays dominated by a particular design factor, and a program storage device performing the method, wherein the method comprises partitioning timing delays in the digital network into portions attributable to a factor of interest and portions attributable to other factors; multiplying the timing delays by different weights based on the factor of interest; and using the multiplied timing delays to determine a relative impact of the factor of interest on the various paths in the digital network. The method further comprises identifying digital network paths whose timing delays are dominated by a particular factor of interest and setting arrival times of timing signals at digital network path start points to zero.

The different weights comprise any of a positive weight, a negative weight, and a zero weight.

Moreover, the method further comprises using arrival times of timing signals at digital network path endpoints to determine an amount of total timing delay of any digital network path to an endpoint attributable to the factor of interest; and using timing margins at a timing test (a comparison between the minimum AT or shortest path to one node and the maximum AT or longest path to another node) to determine whether the total timing delay due to the factor of interest on any path to a first side of any timing test is greater than a multiplicative factor of the total timing delay due to the factor of interest along any path to a second side of the timing test.

Additionally, any digital network path endpoint comprising a positive timing signal arrival time indicates at least one digital network path comprising a total timing delay due to the factor of interest exceeding a specified fraction of the total timing delay. Furthermore, any timing test comprising a negative timing margin indicates a portion of a late mode network path timing delay due to the factor of interest is greater than a multiplicative amount of a portion of an early mode network path timing delay due to the factor of interest.

Additionally, the invention provides a method of performing node-based static timing analysis on a digital network, the method comprising categorizing all factors influencing signal timing delays in the digital network as being attributable to either a factor of interest or to other factors; attributing different weights to the timing delays based on the factor of interest; and identifying paths in the digital network comprising timing delays dominated by a particular factor of interest based on the weighted timing delays.

As mentioned above, delays in a digital network may come from a variety of elements (e.g., gates and wires), and can be influenced by a variety of design characteristics, and due to the ever decreasing design sizes, it is important to have static timing analysis methods which can consider the variation in the different influences on the timing of the digital network. In particular, it is important to be able to identify paths in the digital network whose delays are dominated by a particular factor. It is also important to be able to determine at a timing test whether the delay due to some factor along one of the paths is more than X % greater than that along the other path. As such, the invention provides a novel and advantageous approach, which solves these concerns. Accordingly, the invention provides a method which identifies all paths dominated to a specified percentage by a specified delay contributor, while retaining the runtime advantages of node-based static timing analysis.

These, and other, aspects and objects of the present invention will be better appreciated and understood when considered in conjunction with the following description and the accompanying drawings. It should be understood, however, that the following description, while indicating preferred embodiments of the present invention and numerous specific details thereof, is given by way of illustration and not of limitation. Many changes and modifications may be made within the scope of the present invention without departing from the spirit thereof, and the invention includes all such modifications.

BRIEF DESCRIPTION OF DRAWINGS

The invention will be better understood from the following detailed description with reference to the drawings, in which.

DETAILED DESCRIPTION

The invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the invention. The examples used herein are intended merely to facilitate an understanding of ways in which the invention may be practiced and to further enable those of skill in the art to practice the invention. Accordingly, the examples should not be construed as limiting the scope of the invention.

As previously mentioned, there is a need for a novel node-based static timing analysis approach capable of providing a thorough and complete assessment and evaluation of design performance and which overcomes the deficiencies of the conventional devices and methodologies. Referring now to the drawings, and more particularly to FIGS. 1(a) through 5, there are shown preferred embodiments of the invention.

Figure 1A:
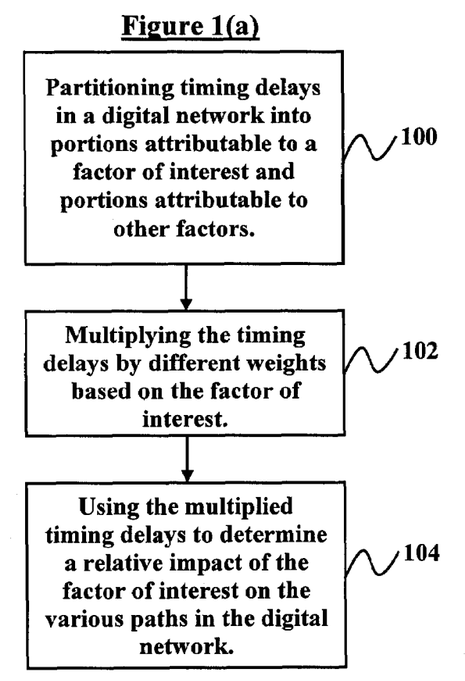
FIGS. 1(a) through 1(d) are flow diagrams illustrating a preferred method of the invention.
Figure 1B:
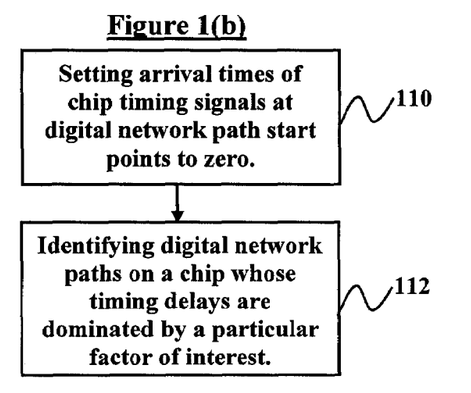

A preferred method of the invention is illustrated in the flow diagram of FIG. 1(a), which shows a method of identifying timing paths in a digital network with timing delays dominated by a particular design factor, wherein the method comprises, first, partitioning 100 timing delays in the digital network into portions attributable to a factor of interest and portions attributable to other factors. Second, multiplying 102 the timing delays by different weights based on the factor of interest, and third, using 104 the multiplied timing delays to determine a relative impact of the factor of interest on the various paths in the digital network. As illustrated in FIG. 1(b), the method further comprises setting 110 arrival times of timing signals at digital network path start points to zero; and identifying 112 digital network paths whose timing delays are dominated by a particular factor of interest. The different weights comprise any of a positive weight, a negative weight, and a zero weight.

Figure 1C:
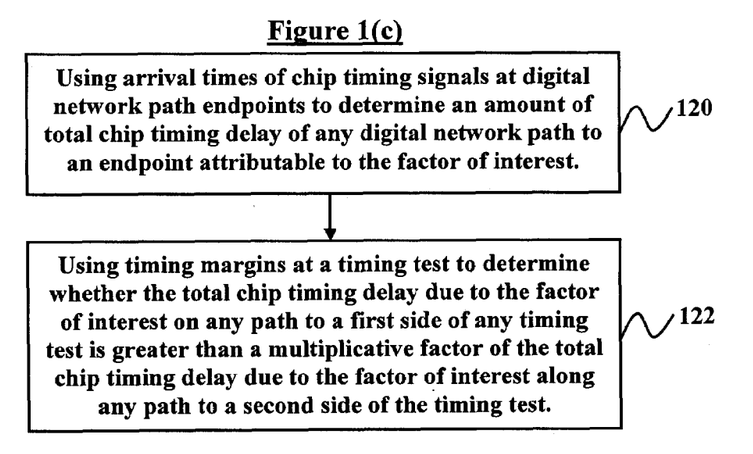

Moreover, as described in FIG. 1(c) the method further comprises using 120 arrival times of timing signals at digital network path endpoints to determine an amount of total timing delay of any digital network path to an endpoint attributable to the factor of interest; and using 122 timing margins at a timing test to determine whether the total timing delay due to the factor of interest on any path to a first side of any timing test is greater than a multiplicative factor of the total timing delay due to the factor of interest along any path to a second side of the timing test, wherein the timing test comprises a difference between an earliest arriving timing signal along a first path in the digital network and a latest arriving timing signal along a second path in the digital network.

The invention provides an alternative to the conventional approaches previously described. According to the invention, node-based or block-based static timing analysis is performed. In the invention's approach a single arrival time (AT) is computed at each node X in the design, as a function of only the ATs on the immediate predecessor nodes of X and the delays between those nodes and X. For late mode analysis (i.e., determining the latest time at which a signal may transition within a given cycle), AT(X)=max of AT(Y)+ d(Y,X) for all predecessor nodes Y of node X. For early mode analysis (i.e., determining the earliest time a signal may transition within a given cycle), AT(X)=min of AT(Y)+ d(Y,X) for all predecessor nodes Y of node X.

Required arrival times (RAT) may also be propagated to determine slacks (timing margins) at various points in the network, where for late mode analysis, RAT(X)=min of RAT(Y)−d(X,Y) for all successor nodes Y of node X, and for early mode analysis, RAT(X)=max of RAT(Y)−d(X,Y) for all successor nodes Y of node X. The timing requirement for correct operation is that the late mode AT at a node occurs before the late mode RAT at that node; i.e., that the latest time a signal transition occurs at a node (the late mode AT) is not after the latest time at which it is allowed to occur (the late mode RAT), and that the early mode AT at a node occurs after the early mode RAT at that node; i.e., that the earliest time a signal transition occurs at a node (the early mode AT) is not before the earliest time at which it is allowed to occur (the early mode RAT). A late mode slack is defined as RAT(X)−AT(X), and an early mode slack is defined as AT(X)−RAT(X), where in both cases a positive slack indicates the margin by which the timing requirement is met and a negative slack indicates the amount by which the timing requirement is missed.

An advantage of the node-based method according to the invention is that the algorithmic complexity and therefore the time taken to perform the analysis is linear (as opposed to exponential) in the size of the network, which can include millions of delay elements, and therefore the analysis will be performed much faster than would be possible using a path-based algorithm of exponential complexity.

Other well-known methods can be used in conjunction with the node-based static timing analysis provided by the invention to enumerate all paths with total delays greater than some specified threshold, without requiring consideration of all other paths in the network. This can be performed by considering all side inputs to the longest path (i.e., edges which feed nodes in the longest path, but which are not themselves on the longest path), and tracing back (in the same manner as was originally done to find the longest path) along the edge which came closest to causing the AT of the node it feeds. That is, for all nodes $X_i$ on the longest path and all nodes $Y_{ij}$ for which an edge $(Y_{ij}, X_i)$ exists in the timing graph, tracing back on the edge $(Y_{ij}, X_i)$ for which $AT(X_i)-[AT(Y_{ij})+d(Y_{ij}, X_i)]$ is minimum. This is then repeated until the desired number of most critical (longest) paths have been determined or the next path traced has a delay smaller than the specified threshold. The same approach can be used to enumerate paths whose early mode delay is less than some specified threshold, but in this case one traces back on sub-paths for which $AT(X_i)-[AT(Y_{ij})+d(Y_{ij}, X_i)]$ (which will now be negative) is maximum. If the number of such paths is small relative to the exponential number of paths in the entire design, this enumeration can be performed efficiently.

Generally, the invention distinguishes between the delays dx in a network which are due to some factor of interest X (e.g., wire delays) and all other delays do which are due to other factors (e.g., factors not of interest). These delays are then multiplied by different positive, negative, or zero weights and are used in a normal node-oriented static timing analysis which allows for the efficient determination of the relative impact of factor X on the various paths in the network. These weights have no physical significance, and are used to control the manner in which AT determination is performed by a conventional node-based static timing analysis.

With one set of weightings, the arrival times (ATs) at the path endpoints can be used to determine whether more than a fraction K of the total delay of any path to the endpoint is due to factor X, and to efficiently trace all paths for which this is true. With another set of weightings the slacks at timing tests in the network can be used to determine whether the total delay due to factor X on any path to one side of any test (e.g., the clock path to a setup test) is more than R times the total delay due to factor X along any path to the other side of the test (e.g., the data path to a setup test).

In other words, according to the invention, any digital network path endpoint comprising a positive timing signal arrival time indicates at least one digital network path comprising a total timing delay due to the factor of interest exceeding a specified fraction of the total timing delay. Furthermore, any timing test comprising a negative timing margin indicates a portion of a late mode network path timing delay due to the factor of interest is greater than a multiplicative amount of a portion of an early mode network path timing delay due to the factor of interest.

The invention provides multiple embodiments. In the embodiments described below, first, all delays in the network are divided into portions due to the factor of interest and portions due to other factors. For factor of interest x and all other factors o, each delay will then be d=dx+do.

In a first embodiment of the invention all paths in a network are identified whose fraction of delay due to some factor x is greater than some specified threshold K. Next all delays dx (i.e., delay due to factor x) are multiplied by any arbitrary positive factor Kx and all delays do (i.e., delay due to other factors o) are multiplied by Kx*K/(1−K). One choice is to set Kx=1/K, so that all delays dx may be multiplied by 1/K and all delays do may be multiplied by −1/(1−K).

Thereafter, ATs at all path start points are set to zero. If all X-dominated paths are to be traced, then the required arrival times (RATs) at all path endpoints may be set to zero, allowing normal slack-based late mode path tracing to be used to determine the X-dominated paths. Whereas, if it is only desirable to determine whether at least one AT-dominated path exists to any given path endpoint, no RAT setting or propagation is required. A normal late mode node-oriented static timing analysis is then performed. Any path endpoint whose AT is greater than zero is now known to have at least one path whose total delay due to factor X exceeds a fraction K of the total path delay.

Furthermore, known methods for enumerating critical paths may be applied to enumerate all paths with a total delay greater than zero. These will be exactly those paths in which factor x delay dx exceeds a fraction K of the total path delay.

The invention can also be applied in early mode analysis, in which case the weightings would be negated (i.e., for any positive value Kx, all delays dx would be multiplied by −Kx and all delays do would be multiplied by Kx*K/(1−K)). In this case any paths with total delay less than zero would be dominated by delay factor x, and early mode critical path enumeration would identify the paths in which factor x delay dx exceeds a fraction K of the total path delay.

Figure 1D:
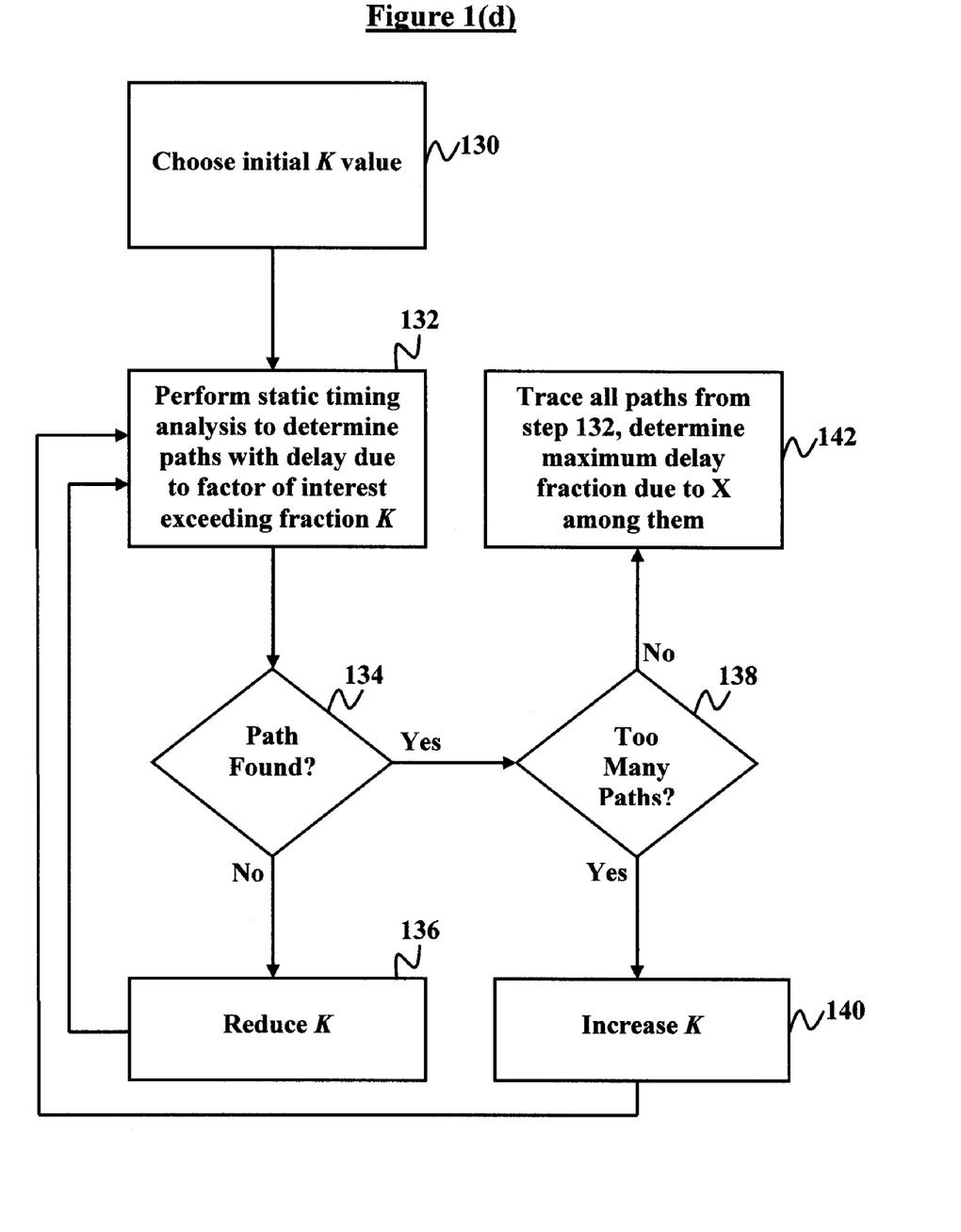

FIG. 1(d) illustrates a second embodiment of the invention in which the largest fraction of any path delay due to factor X is determined. In step 130 an initial value of K is chosen. This value may be an estimate of the largest fraction of any path delay due to factor X, the fraction delay due to factor X in an arbitrarily chosen path, or an arbitrary value between 0 and 1. In step 132 a node-based static timing analysis is performed using start node arrival times of zero and delays which are scaled by weighting factors computed from the initial K factor in the same manner as described in the first embodiment. In step 134 it is determined whether or not any paths were found in which the fraction of delay due to factor X exceeded K (e.g., for a late mode node-based static timing analysis, any paths with endpoint arrival times greater than zero) are found. If not, the K factor was an over-estimate of the largest fraction of any path delay due to factor X, and must be reduced in step 136 before returning to step 132. The new value of K must be greater than any value of K which was increased in step 140 of a previous iteration of the method. If such paths were found, it is determined in step 138 by beginning an enumeration of such paths using known methods, whether the number of such paths is too large to allow efficient enumeration. This may be determined, for example, by stopping the enumeration when a predetermined number of paths have been identified. If the number of such paths is determined to be excessive, the K value is reduced in step 142 before returning to step 132. The reduced value of K may most efficiently be determined by computing the maximum value of the exact fraction of path delay due to factor X among the paths enumerated while determining whether the number of such paths was excessive, and will in any case be less than any value of K which was decreased in step 136 of a previous iteration of the method. This exact fraction for a given path is computed by adding the portions of delay along the path due to factor X, and dividing it by the sum of all delays (both due to factor X and to other factors) along the path. If the number of such paths is not excessive, the maximum value of the exact fraction of path delay due to factor X among the paths enumerated is determined in step 142, and reported as the maximum such fraction of all paths in the digital network.

In a third embodiment, it is determined which timing tests in which the portion of the delay of the late mode path to the test which is due to factor X is greater than R times the portion of the delay of the early mode path to the test which is due to factor X. In this case the start node arrival times are again set to zero, the delays dx in the late mode paths are multiplied by any positive factor Kx, and the delays do in the late mode paths are multiplied by 0 (i.e., they are omitted). The delays dx in the early mode paths are multiplied by Kx*R, and the delays do in the early mode paths are also multiplied by 0. A normal static timing analysis is then performed. Any test with a negative slack indicates that the portion of the delay of some late mode path to the test which is due to factor X is greater than R times the portion of the delay of some early mode path to the test which is due to factor X.

Once again normal path tracing (using the RATs computed due to the test) can be used to trace all pairs of paths for which this is true. Accordingly, one may determine all negative slack early and late mode paths to the test (using known critical path tracing methods applied to the weighted-delay timing analysis), and only selected pairs of these paths will satisfy the property of interest. In particular, if the slack at the test (due to the worst weighted-delay early (e) and late (l) mode paths) is S, any early/late pair of such paths with slacks Se and Sl such that S−Se−Sl>0 will satisfy the property of interest. For example, if the test slack is −4, a late mode path of slack −2 paired with an early mode path of slack −3 would satisfy the criterion, as S−Se−Sl=−4−(−2)−(−3)=+1>0. However, a late mode path of slack −2 paired with an early mode path of slack −1 would not satisfy the criterion, as S−Se−Sl=−4−(−2)−(−1)=−1<0.

As an example, illustrating the first embodiment, suppose for Path 1 it is assumed that the upper bound on the fraction of path due to X=60%, the delay due to X=100, and the delay not due to X=120. Thus, the path fraction due to X=100/(100+120)=45.5%, and the final arrival time=(0.4*100)−(0.6*120)=−32, which is less than 0, therefore the criteria is satisfied (i.e., fraction of total delay due to X is less than the upper bound, in this example 60%). Next, suppose for Path 2 it is assumed that the upper bound on the fraction of path due to X=60%, the delay due to X=80, and the delay not due to X=50. Thus, the path fraction due to X=80/(80+50)=61.5%, and the final arrival time=(0.4*80)−(0.6*50)=2, which is greater than 0, therefore the criteria is not satisfied (i.e., fraction of total delay due to X is greater than the upper bound), which indicates that the time delay is due to factor X (X-dominated).

Figure 2:
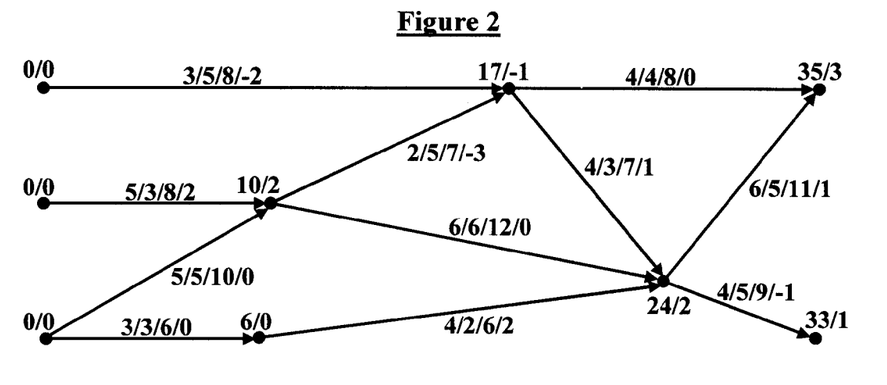
FIG. 2 is a graphical diagram of an original timing path through a network according to an embodiment of the invention.

FIG. 2 illustrates the first embodiment of the invention in a late mode analysis. Here, K=0.5 (or 50%) and Kx=1.0, so that all dx will be scaled by Kx=1.0, and all do will be scaled by −Kx*K/(1−K)=−1.0. Thus, the weightings are +1 for a delay due to X and −1 for a delay not due to X. The delay labels in the network shown in FIG. 1 are dw/do/dtotal/dscaled, where dw is the delay of the edge attributable to the wire (factor of interest), do is the delay of the edge attributable to other factors, dtotal is the total delay of the edge, and dscaled is the scaled delay of the inventive method. The ATs on the nodes are ATnormal/ATscaled both computed by a conventional late mode static timing analysis, where ATnormal is the AT computed using delay dtotal for each edge, and ATscaled is the AT computed using the delay dscaled for each edge.

The calculations derived by the invention answer a different question than the conventional calculations. The conventional static timing answers "What is the longest path?" Whereas, the invention answers the question "Does the fraction of delay in any path due to factor X exceed K?"

Figure 3:
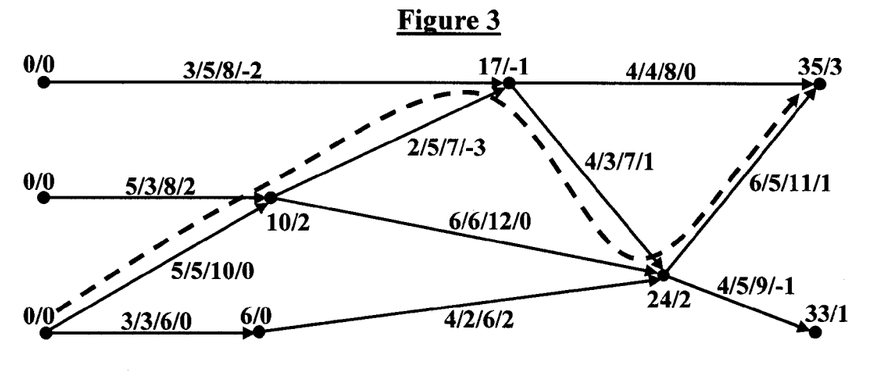
FIG. 3 is a graphical diagram of a normal timing path through a network according to an embodiment of the invention.
Figure 4:
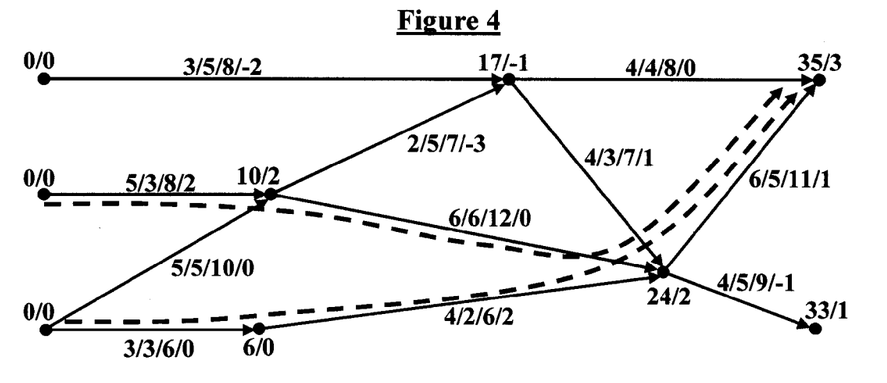
FIG. 4 is a graphical diagram of a scaled timing path through a network according to an embodiment of the invention.

FIG. 3 shows the critical path to the first output due to a normal timing analysis by tracing the origin of each ATnormal through predecessor ATnormal+dtotal. The critical path has a total delay of 35. Specifically, this path has a wire delay of 17 (5+2+4+6) and a non-wire delay of 18 (5+5+3+5), for a total delay of 35 and a wire delay fraction of 0.486. FIG. 4 shows the two critical paths to the first output according to the inventive method by tracing the origin of each ATscaled through predecessor ATscaled+ dscaled, both of which have total path delays greater than 0 using the scaled delays of the inventive method. The upper path has a wire delay of 17 (5+6+6) and a non-wire delay of 14 (3+6+5), for a total delay of 31 and a wire delay fraction of 0.548. The total scaled delay for this path is 3, and is positive because the wire delay fraction is above the specified threshold of 0.5. The lower path has a wire delay of 13 (3+4+6) and a non-wire delay of 10 (3+2+5), for a total delay of 23 and a wire delay fraction of 0.565. The total scaled delay for this path is 3, and is positive because the wire delay fraction is above the specified threshold of 0.5. It is significant that neither of these paths is the same path traced by the conventional (un-scaled delay) static timing analysis in FIG. 3. All paths with total scaled delay greater than zero will also have wire delay fractions greater than the threshold of 0.5. Thus, the paths are not compared; instead both of these paths (and others not shown, including the path terminating at the lower right node and causing the positive ATscaled of 1 there) will be reported to the user. Alternatively, as in FIG. 1(d), the wire delay fraction of each path will be determined and the path with the greatest wire delay fraction will be reported.

Figure 5:
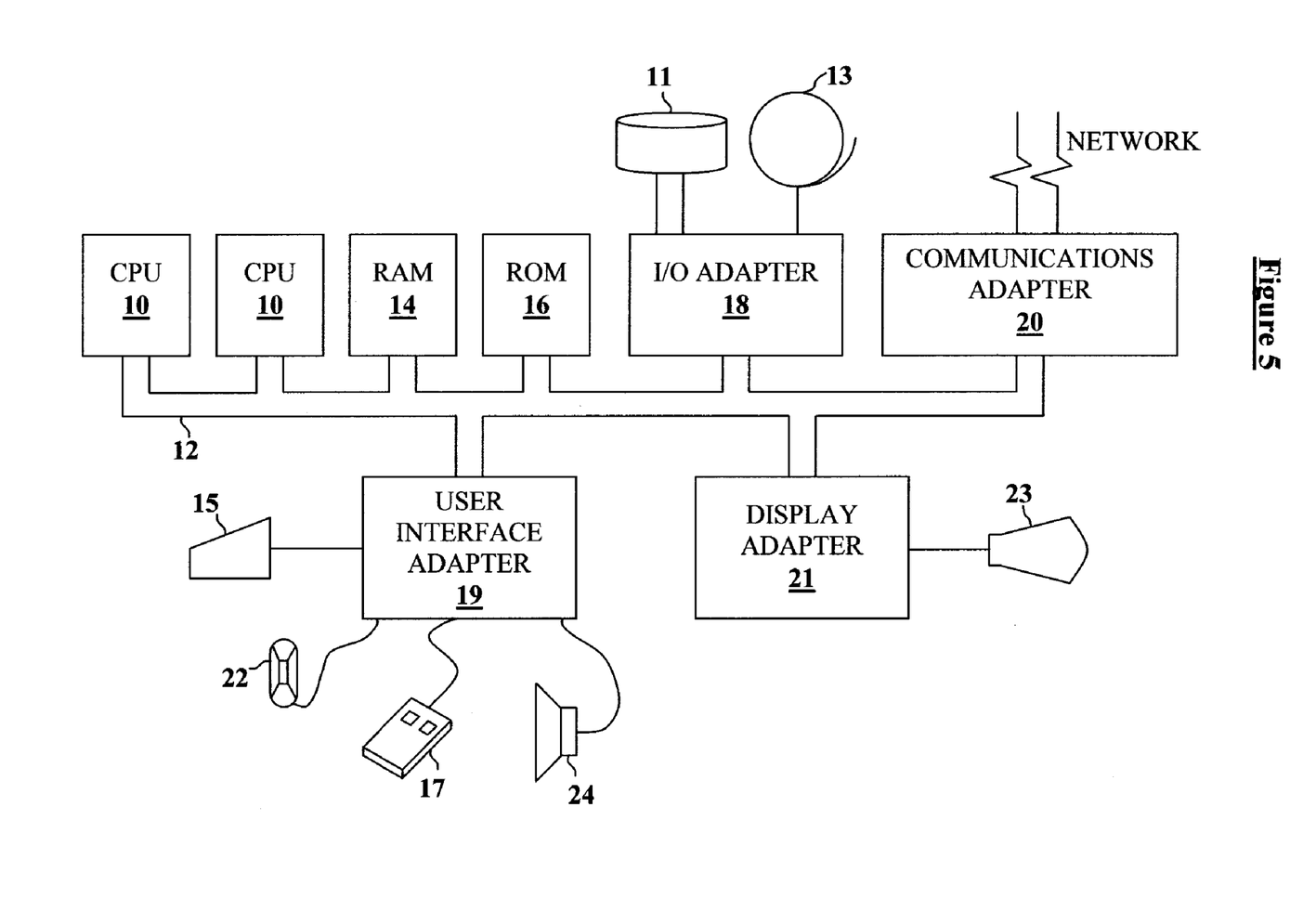
FIG. 5 is a system diagram according to an embodiment of the invention.

A representative hardware environment for practicing the present invention is depicted in FIG. 5, which illustrates a typical hardware configuration of an information handling/computer system in accordance with the invention, having at least one processor or central processing unit (CPU) 10. The CPUs 10 are interconnected via system bus 12 to random access memory (RAM) 14, read-only memory (ROM) 16, an input/output (I/O) adapter 18 for connecting peripheral devices, such as disk units 11 and tape drives 13, to bus 12, user interface adapter 19 for connecting keyboard 15, mouse 17, speaker 24, microphone 22, and/or other user interface devices such as a touch screen device (not shown) to bus 12, communication adapter 20 for connecting the information handling system to a data processing network, and display adapter 21 for connecting bus 12 to display device 23. A program storage device readable by the disk or tape units is used to load the instructions, which operate the invention, which is loaded onto the computer system.

The invention achieves several advantages such as the ability to identify paths in a digital network whose delays are dominated by a particular factor, and the ability to determine at a timing test (a comparison between the earliest arriving signal along one path and the latest arriving signal along another path) whether the delay due to some factor along one of the paths is more than X % greater than that along the other path. Accordingly, the invention provides a method which identifies all paths dominated to a specified percentage by a specified delay contributor, while retaining the runtime advantages of node-based static timing analysis.

Generally, the invention provides a method of performing node-based static timing analysis on a digital network by categorizing factors influencing signal timing delays in the digital network as being attributable to either a factor of interest or to some other factor(s). Then, the invention attributes different weights to the timing delays based on the factor of interest to produce weighted timing delays, and identifies paths in the digital network whose timing delays dominated by a particular factor of interest based on the weighted timing delays. The invention also provides a method of determining the path in a digital network in which the greatest fraction of delay is due to a factor of interest.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

The invention claimed is:

1. A method of identifying timing paths in a digital network with timing delays dominated by a particular factor, said method comprising:
    partitioning timing delays in said digital network into portions attributable to a factor of interest and portions attributable to other factors;
    multiplying said timing delays by different weights based on said partitioning;
    using the multiplied timing delays to determine a relative timing delay impact of said factor of interest on the various paths in said digital network, wherein said different weights comprise any of a positive weight, a negative weight, and a zero weight;
    inputting a threshold fraction value;
    setting said different weights on said portion of timing delays attributable to said factor of interest to a first value; and
    setting said different weights on said portion of timing delays attributable to said other factors.

2. The method of claim 1, all the limitations of which are incorporated herein by reference, further comprising determining a path in said digital network for which a ratio between a sum of said portion of timing delay attributable to said factor of interest and a sum of said portion of timing delay attributable to said other factors is maximum.

3. The method of claim 2, all the limitations of which are incorporated herein by reference, further comprising:
    adjusting said threshold fraction value;
    repeating said setting of said different weights using said adjusted threshold fraction value; and
    repeating said node-based static timing analysis step.

4. A method of identifying timing paths in a digital network with timing delays dominated by a particular factor, said method comprising:
    partitioning timing delays in said digital network into portions attributable to a factor of interest and portions attributable to other factors;
    multiplying said timing delays by different weights based on said partitioning;
    using the multiplied timing delays to determine a relative timing delay impact of said factor of interest on the various paths in said digital network, wherein said different weights comprise any of a positive weight, a negative weight, and a zero weight;
    performing a node-based static timing analysis on said digital network using said multiplied timing delays; and
    identifying path endpoints of said digital network to which at least one path has a timing delay fraction attributable to said factor of interest which is greater than or equal to said first value.

5. The method of claim 4, all the limitations of which are incorporated herein by reference, wherein said first multiplicative weight of said first value is positive, wherein said node-base static timing analysis comprises a late mode analysis, and said endpoint identification comprises identifying path endpoints whose signal arrival time computed by said node-base static timing analysis is greater than zero.

6. The method of claim 4, all the limitations of which are incorporated herein by reference, wherein said first multiplicative weight of said first value is negative, wherein said node-base static timing analysis comprises an early mode analysis, and
    said endpoint identification comprises identifying path endpoints whose signal arrival time computed by said node-base static timing analysis is less than zero.

7. A method of identifying timing paths in a digital network with timing delays dominated by a particular factor, said method comprising:

partitioning timing delays in said digital network into portions attributable to a factor of interest and portions attributable to other factors;

multiplying said timing delays by different weights based on said partitioning;

using the multiplied timing delays to determine a relative timing delay impact of said factor of interest on the various paths in said digital network;

using arrival times of timing signals at digital network path endpoints to determine an amount of total timing delay of any digital network path to an endpoint attributable to said factor of interest; and     using timing margins at a timing test to determine whether said total timing delay due to said factor of interest on any path to a first side of any timing test is greater than a multiplicative factor of said total timing delay due to said factor of interest along any path to a second side of said timing test.

8. The method of claim 7, all the limitations of which are incorporated herein by reference, wherein said timing test comprises a difference between an earliest arriving timing signal along a first path in said digital network and a latest arriving timing signal along a second path in said digital network.

9. The method of claim 7, all the limitations of which are incorporated herein by reference, wherein any digital network path endpoint comprising a positive timing signal arrival time indicates at least one digital network path comprising a total timing delay due to said factor of interest exceeding a specified fraction of said total timing delay.

10. The method of claim 7, all the limitations of which are incorporated herein by reference, wherein any timing test comprising a negative timing margin indicates a portion of a late mode network path timing delay due to said factor of interest is greater than a multiplicative amount of a portion of an early mode network path timing delay due to said factor of interest.

11. A method of performing node-based static timing analysis on a digital network, said method comprising:

categorizing factors influencing signal timing delays in said digital network as being attributable to either a factor of interest or to other factors;

attributing different weights to the timing delays based on said categorization to produce weighted timing delays;

identifying network paths in said digital network comprising timing delays dominated by a particular factor of interest based on said weighted timing delays;

using arrival times of timing signals at digital network path endpoints to determine an amount of total timing delay of any digital network path to an endpoint attributable to said factor of interest; and     using timing margins at a timing test to determine whether said total timing delay due to said factor of interest on any path to a first side of any timing test is greater than a multiplicative factor of said total timing delay due to said factor of interest along any path to a second side of said timing test.

12. The method of claim 11, all the limitations of which are incorporated herein by reference, wherein said timing test comprises a difference between an earliest arriving timing signal along a first path in said digital network and a latest arriving timing signal along a second path in said digital network.

13. The method of claim 11, all the limitations of which are incorporated herein by reference, wherein any digital network path endpoint comprising a positive timing signal arrival time indicates at least one digital network path comprising a total timing delay due to said factor of interest exceeding a specified fraction of said total timing delay.

14. The method of claim 11, all the limitations of which are incorporated herein by reference, wherein any timing test comprising a negative timing margin indicates a portion of a late mode network path timing delay due to said factor of interest is greater than a multiplicative amount of a portion of an early mode network path timing delay due to said factor of interest.

* * * * *